United States Patent
Bradley et al.

(10) Patent No.: US 12,179,581 B2
(45) Date of Patent: Dec. 31, 2024

(54) COMPACT DUAL LAYSHAFT POWER TRANSMITTING GEAR ARRANGEMENT

(71) Applicant: Magna Powertrain of America, Inc., Troy, MI (US)

(72) Inventors: Douglas Bradley, Sterling Heights, MI (US); David Wenthen, Rochester Hills, MI (US); Douglas Botto, Royal Oak, MI (US)

(73) Assignee: Magna Powertrain of America, Inc.

( * ) Notice: Subject to any disclaimer, the term of this patent is extended or adjusted under 35 U.S.C. 154(b) by 0 days.

(21) Appl. No.: 18/411,070

(22) Filed: Jan. 12, 2024

(65) Prior Publication Data
US 2024/0239189 A1 Jul. 18, 2024

Related U.S. Application Data

(60) Provisional application No. 63/439,210, filed on Jan. 16, 2023.

(51) Int. Cl.
*B60K 1/00* (2006.01)
*B60K 17/16* (2006.01)
(Continued)

(52) U.S. Cl.
CPC ............. *B60K 17/165* (2013.01); *B60K 1/00* (2013.01); *F16H 37/0813* (2013.01); *B60K 2001/001* (2013.01); *F16H 2037/048* (2013.01)

(58) Field of Classification Search
CPC ............... F16H 2037/048; F16H 37/08; F16H 37/0813; B60K 17/165; B60K 1/00; B60K 2001/001
(Continued)

(56) References Cited

U.S. PATENT DOCUMENTS 5,620,387 A * 4/1997 Janiszewski ............. B60K 1/00
475/207
7,244,210 B2 7/2007 Hamai et al.
(Continued)

FOREIGN PATENT DOCUMENTS

DE 102022108340 A1 * 5/2022 ............... B60K 1/02

OTHER PUBLICATIONS

Merged CN103486217A and english translation; Jun. 23, 2024 (Year: 2024).*

(Continued)

*Primary Examiner* — Roger L Pang
(74) *Attorney, Agent, or Firm* — Dickinson Wright PLLC

(57) ABSTRACT

A power transmission gearbox assembly includes a motor with a rotor shaft and an input gear fixed to the rotor shaft. The input gear is part of a first gearset including a first gear disposed on a first axial side of a differential assembly having two output shafts. A second gear set having a second gear and third gear is disposed on the opposite axial side of the differential assembly. A first layshaft, radially offset from the output shafts, includes the first and second gears. A second layshaft offset from the first layshaft, includes the third gear and a fourth gear that is in meshed engagement with a differential gear. The first layshaft spans across the width of the differential gear, and does not contact the differential gear. The first and second gearsets being on opposite sides of the differential assembly reduces the axial extend of the gearbox.

18 Claims, 8 Drawing Sheets

(51) Int. Cl.
  *F16H 37/08*    (2006.01)
  *F16H 37/04*    (2006.01)
(58) Field of Classification Search
  USPC .................................................. 475/150, 198
  See application file for complete search history.

(56) References Cited

U.S. PATENT DOCUMENTS

2015/0360554 A1* 12/2015 Piazza ...................... B60K 6/48
                                                              903/910
2023/0392672 A1* 12/2023 Cattoor .................. B60K 17/08

OTHER PUBLICATIONS

English translation of DE102022108340A1; http://translationportal.epo.org; Jun. 23, 2024 (Year: 2024).*

* cited by examiner

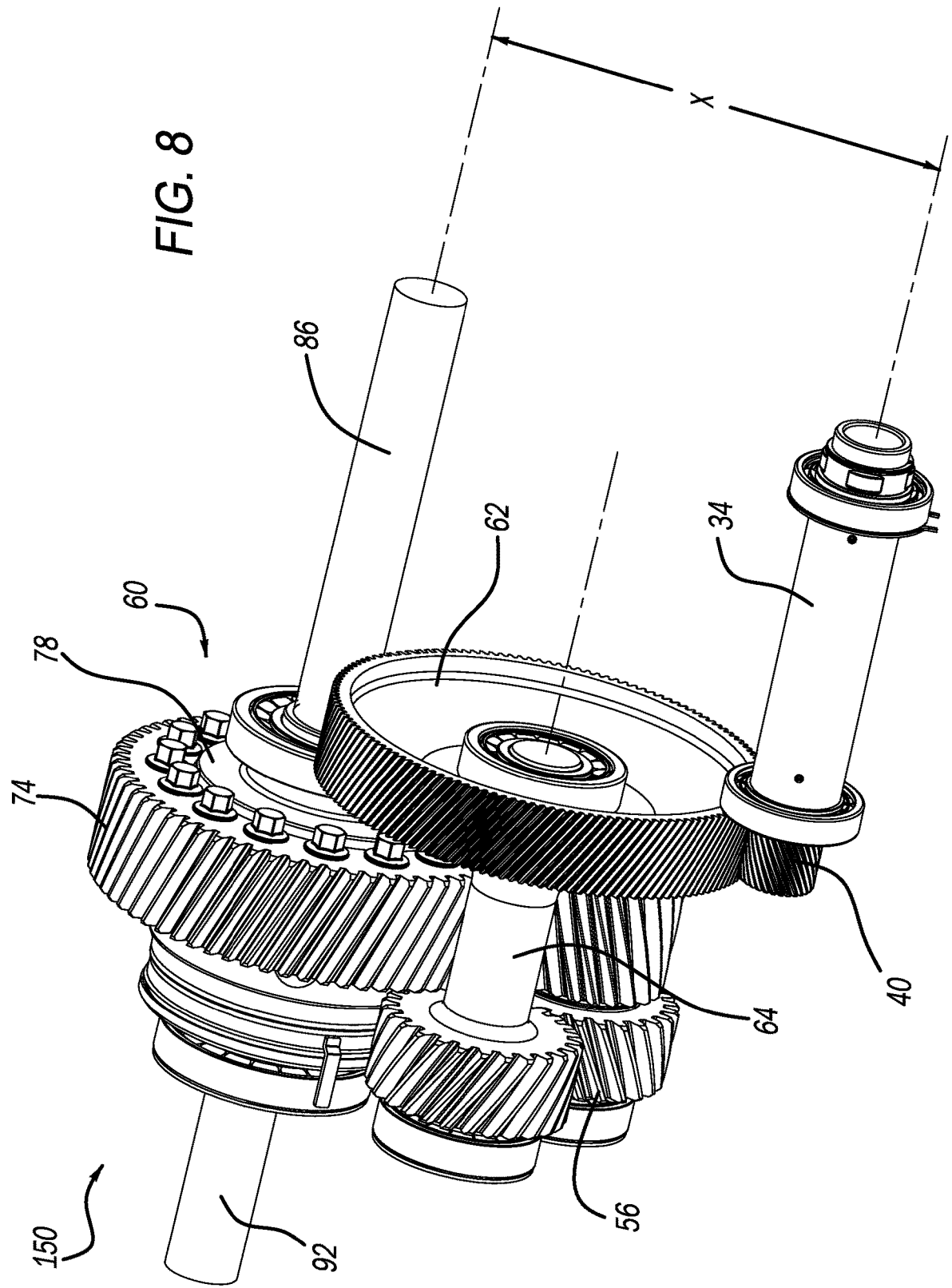

COMPACT DUAL LAYSHAFT POWER TRANSMITTING GEAR ARRANGEMENT

FIELD OF THE INVENTION

The present invention relates to an electric drive axle for motor vehicles. More particularly, the present invention relates to a dual layshaft power transmission with a compact arrangement providing a high reduction gear ratio for a coaxial or offset electric drive axle.

BACKGROUND OF THE INVENTION

This section provides background information related to the present disclosure which is not necessarily prior art.

In view of the recent commitment of most motor vehicle OEM's to develop electric vehicles (EV's), in particular vehicles requiring increased performance, a great deal of engineering activity has been directed to providing driveline arrangements to provide high efficiency and increased power output to the drive wheels in a compact arrangement. To achieve increased power output, one solution is to numerically increase the overall gear ratio between the electric motor and the drive wheels, resulting in reducing the motor output speed and increasing the motor output torque as measured at the wheels. Increasing the overall gear ratio above 10.0:1 has typically led to concepts where the gear arrangement requires large diameter gears, or utilizing multi axis layshaft arrangements to provide steps of ratios to achieve the desired ratio, often arranged in a manner increasing the axially length of the electric drive axle. As the power transmitted through the gear train increases, gear tooth stresses must be considered resulting in limitations to optimizing the size of the gears. While these solutions can achieve the increased overall gear ratios required, often times the arrangements exceed allowable packaging environments interfering with vehicle subframes, battery enclosures, and other vehicle components.

An example of an electric drive axle is described in U.S. Pat. No. 7,244,210B2 issued on Jul., 17, 2007. In this patent, a power transmitting gear arrangement is described in the first embodiment where motor torque is subjected to a first stage speed reduction, a second stage speed reduction, and a third stage speed reduction utilizing an internal ring gear where a large reduction gear ratio (about 4 to 6:1) can be realized in the third stage. Although this arrangement achieves a high reduction ratio, the positioning of the first and second speed reduction gearsets in the axial space between the input gear and the ring gear results in a longer axial packaging length. In other words, increased axial space needs to be provided between the input gear and the ring gear/differential to adapt for the first and second layshaft placement. To attempt to minimize the radial dimensional extents of the gear arrangement from the centerline of the motor, an internal ring gear is proposed. Manufacturing such an internal ring gear can be complex and costly.

Therefore, there is a need to provide a new geartrain arrangement which maximizes the available space, radially and axially, and maximizes the ability to provide overall gear ratios above 10:1 while providing a highly efficient transfer of power from the source to the vehicle's wheels.

SUMMARY

This section provides a general summary of the many aspects associated with the inventive concepts embodied in the teachings of the present disclosure and is not intended to be considered a complete listing of its full scope of protection nor all of its features and advantages.

It is an aspect of the present disclosure to provide a power transmitting gear arrangement where power flow is from an input gear into a first reduction gearset, to a second gearset, to a third gearset, to a differential gear, and through a differential housing and differential gearset, distributing power between first and second output shafts where the differential gear is positioned between the first and second gearsets.

It is a related aspect of the present disclosure to provide a dual layshaft arrangement where first gearset is positioned on a first side of the differential housing and the second gearset is positioned on the second side of the differential housing, on the side opposite from the input gear It is an aspect of the present disclosure to provide a power transmitting gear arrangement where the first layshaft spans across the width of the differential gear face without contact, positioning at least a portion of the differential housing and differential gear in the space between the first gear set and the second gear set It is an aspect of the present disclosure that the power transmitting gear arrangement described provides a reduced axial length when compared to arrangements where the gearsets are positioned only on one side of the differential gear It is a related aspect of the present disclosure to provide a power transmitting gear arrangement which provides for a reduced axial length between the centerline of an input gear and the centerline of the differential bevel gear resulting in the ability to position the center of a differential bevel gear closer to the centerline of the vehicle given the same input gear position It is a related aspect of the present disclosure wherein a differential bevel gear is utilized to distribute the power to left and right wheels of the vehicle It is a related aspect of the present disclosure to provide a gear arrangement which provides a high reduction gear ratio while achieving a high torque transmitting efficiency It is a related aspect of the present disclosure where the power transmitting gear arrangement has a first layshaft which includes a first gear and a second gear It is a related aspect of the present disclosure where the power transmitting gear arrangement has a second layshaft which includes a third gear and a fourth gear It is an aspect of the present disclosure that the input gear is provided on a first axis, a first layshaft is positioned on a second axis parallel but displaced radially from the first axis, a second layshaft is positioned parallel to the input gear and the first layshaft and displaced radially from the first axis, and a differential gear is positioned on the same first axis of the input gear to create a coaxial power transmitting gear arrangement It is a related aspect of the present disclosure that the second layshaft can be displaced radially from the first axis at a different distance than the first layshaft It is an aspect of the present disclosure that input gear is provided on a first axis, a first layshaft is positioned on a second axis parallel but displaced radially from the first axis, a second layshaft positioned parallel to the input gear and the first layshaft and displaced radially from the second axis, and a differential gear is positioned on a fourth axis to create an offset power transmitting gear arrangement It is a related aspect of the present disclosure that the input gear on a first axis can be positioned at any radial position about the first layshaft's second axis to create an offset arrangement relative to the output shafts on the fourth axis It is a related aspect of the present disclosure to provide a gear arrangement is provided where the first layshaft shaft portion is positioned radially as close as possible to the outer extents of the differential gear to reduce radial packaging space occupied by the gear arrangement It is a related aspect of the present disclosure that a gear arrangement is provided where the second layshaft is positioned radially as close as possible to the outer extents of the differential gear and first reduction gear to reduce packaging space utilized It is a related aspect of the present disclosure that the power transmitting gear arrangement power source and input gear is directly or indirectly provided from an electric motor's rotor shaft It is a related aspect of the present disclosure that the power transmitting gear arrangement power source is from a power generating device other than from an electric motor It is a related aspect of the present disclosure additional layshafts beyond the two described which could be utilized to obtain higher ratios if required, positioned in the power flow between the first layshaft and the differential gear.

It is a related aspect of the present disclosure the geartrain tooth form can be helical or spur.

These and other features and advantages of the present invention will become more readily appreciated when considered in connection with the following detailed description and appending drawings.

BRIEF DESCRIPTION OF THE DRAWINGS

The drawings described herein are for illustrative purposes only of selected embodiments and are not intended to limit the scope of the present disclosure. The inventive concepts associated with the present disclosure will be more readily understood by reference to the following description in combination with the accompanying drawings wherein:

FIG. 8 is an isometric view of the power transmitting gear arrangement as viewed from the side of the first gearset in an offset arrangement.

DETAILED DESCRIPTION

The present disclosure is related to a compact high reduction ratio power transmitting gear used in an electric drive axle. The electric drive axle is electrically-controlled for delivering motive power (i.e., drive torque) to a pair of ground-engaging wheels. Example embodiments of the power transmitting gear arrangement and electric drive axle will now be more fully described with reference to the accompanying drawings. The drawings will include two alternative configurations of the power transmitting gear arrangement, a first with a coaxial arrangement between the input gear and the output shafts and a second where a radially offset arrangement exists between the input gear and the output shafts. It should be appreciated other arrangements of the offset power transmitting gear arrangement could be arranged by varying the locations of the input shaft about the first reduction gear and the example provided is merely an example of orientation. Accordingly, various features and functional characteristics of the power transmitting gear arrangement will be set forth below in a manner permitting those skilled in relevant arts to fully comprehend and appreciate the significant advantages the present disclosure provides.

Figure 1:
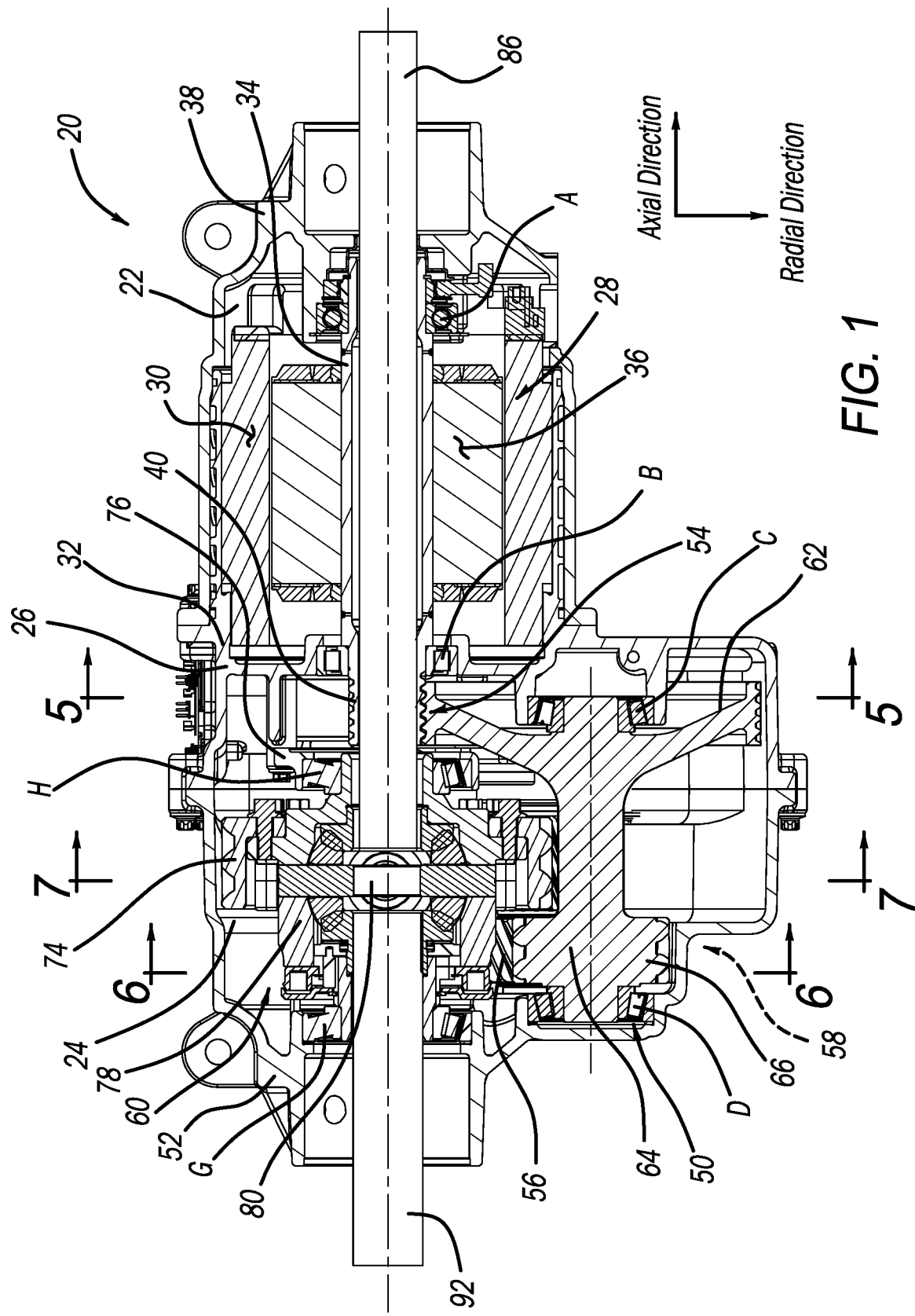
FIG. 1 is a cross sectional view of an electric drive axle utilizing the compact high reduction ratio power transmitting gear in a coaxial arrangement.

With initial attention directed to FIG. 1, a cross section of the coaxial version of electric drive axle 20 is shown taken at the centerline of the shared axis of the input and output shafts. Electric drive axle 20 includes a multipart housing arrangement defining a motor chamber 22 and a gearbox chamber 24 separated by a support wall 26. An electric variable speed motor 28 is located within motor chamber 22 and includes a stator 30 secured to system housing 32, an elongated tubular rotor shaft 34 and a rotor assembly 36 fixed for rotation with rotor shaft 34. A motor cover housing 38 seals the open motor end of system housing 32. Rotor shaft 34 is supported at a first end by bearing A for rotation relative to motor cover 38. Rotor shaft 34 is supported at a second end by bearing B for rotation relative to system housing 32. An input gear 40 is provided at the second end of the rotor shaft 34. Input gear 40 can be integrally formed in rotor shaft 34 or a separate component fixed to the end of rotor shaft 34. Support wall 26 is the main central portion of system housing 32. Electric drive axle 20 further includes a power transmitting gear arrangement 50 located within gearbox chamber 24. Gearbox chamber 24 is formed between system housing 32 and gearbox housing 52. Power transmitting gear arrangement 50 is comprised of a first gearset 54, a second gearset 56, and a third gearset 58 driving a differential assembly 60. In this coaxial arrangement, differential assembly 60 and rotor shaft 34 are positioned on a common first axis. The gear form proposed is helical for reduced NVH, but the same gear arrangement can be utilized with a spur gear form. First gearset 54 includes input gear 40 which is in constant meshed engagement with first gear 62. A first layshaft 64, positioned at a second axis parallel and spaced radially away from the first axis, fixedly connects first gear 62 and second gear 66. First layshaft 64 is supported on first end by bearing C for rotation relative to system housing 32 and on a second end by bearing D for rotation relative to gearbox housing 52. Second gearset 56 includes second gear 66 which is in constant meshed engagement with third gear 68. A second layshaft 70 fixedly connects third gear 68 and fourth gear 72 but are hidden from view behind differential assembly 60 in FIG. 1. The support arrangement and gear arrangements for second layshaft 70 will be described later as it can be seen clearer in FIG. 3, but forth gear 72 is in constant meshed engagement with differential gear 74 of differential gear assembly 60. Differential gear assembly 60 is supported by bearing H for rotation relative to support plate 76 on a first end, closest to motor 28. Differential gear assembly 60 is supported by bearing G for rotation relative to gearbox housing 52 on a second end. Support plate 76 is fastened to system housing 32.

Figure 2:
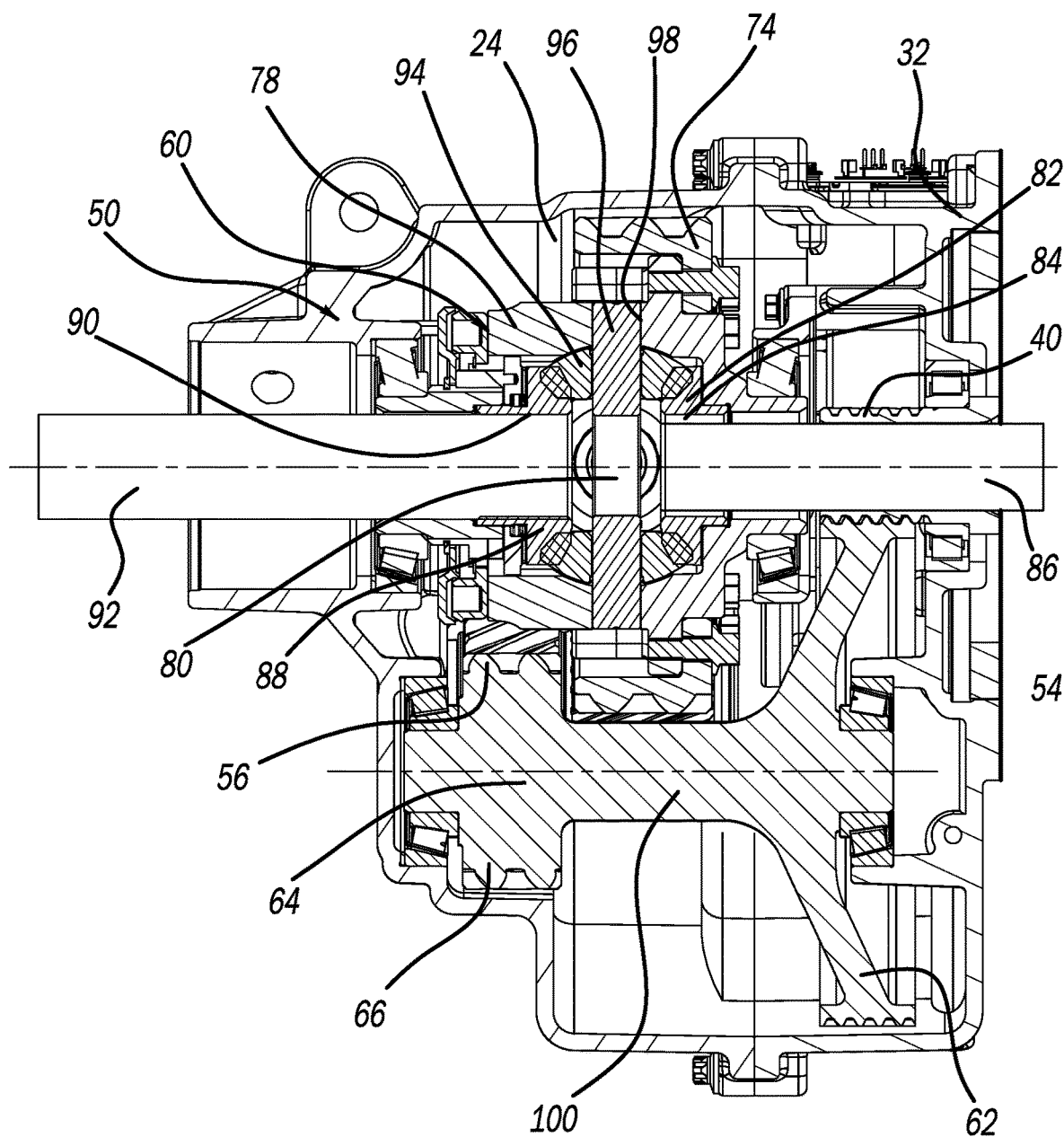
FIG. 2 is a cross sectional view of the compact high reduction ratio power transmitting gear in a coaxial arrangement.

Referring to FIG. 2, differential gear assembly 60 is proposed as a standard bevel differential known by those in the art. Differential gear 74 is fixed to differential housing 78, resulting in power being transmitted from differential gear 74, through differential housing 78, and into bevel gear arrangement 80. Bevel gear arrangement 80 further includes a first side gear 82 fixed via a spline connection 84 to a first output shaft 86, a second side gear 88 fixed via a spline connection 90 to a second output shaft 92, and at least one pair of pinions 94 meshed with side gears 82 and 88. Pinions 94 are rotatably supported on a pinion shaft 96 having its ends located opposing bores 98 in differential housing 78. Power therefore will be provided to differential gear assembly 60 via the constant mesh engagement of forth gear 72 with differential gear 74, through a differential housing 78, into differential gearset 80 distributing power between a first 86 and second output shaft 92. First 86 and second output shaft 92 will drive a pair of ground engaging wheels.

Continuing to refer to FIG. 2, the axially space saving arrangement of the first gearset 54 and second gearset 56 relative to differential gear 74 will be further described. In traditional arrangements, any gearsets required to provide the reduction ratio have been typically positioned in the axial space defined between input gear 40 and differential gear 74. Differential gear 74 can be positioned closer to the second side of differential housing 78, for instance towards bearing G but this only provides a minimal increase in axial space to position the required gearsets. As it is best practice to provide a reduced axial length electric drive axle 20, input gear 40 is positioned as close axially to the center of bevel gear arrangement 80 as possible, often resulting in only a single layshaft in the allowable space. This results in a power transmitting gear arrangement with a minimal reduction ratio. Increasing ratio through the use of additional gearsets and layshafts results in increasing the axial or radial space often resulting in vehicle packaging interference issues. Therefore, providing the ability to position the second gearset 56 on the opposite side of differential gear 74 than the first gearset 54 provides a packaging advantage as the space on the side of the differential assembly 60 away from the motor 28 can be utilized, particularly if differential gear 74 is positioned in a more central arrangement on differential housing 78. First layshaft 64 is designed to include a central shaft portion 100 providing connection between first gear 62 and second gear 66, maintaining an axial separation between first gear 62 and second gear 66, spanning across the width of differential gear 74 and transferring power from the first gearset 54 and second gearset 56.

Figure 3:
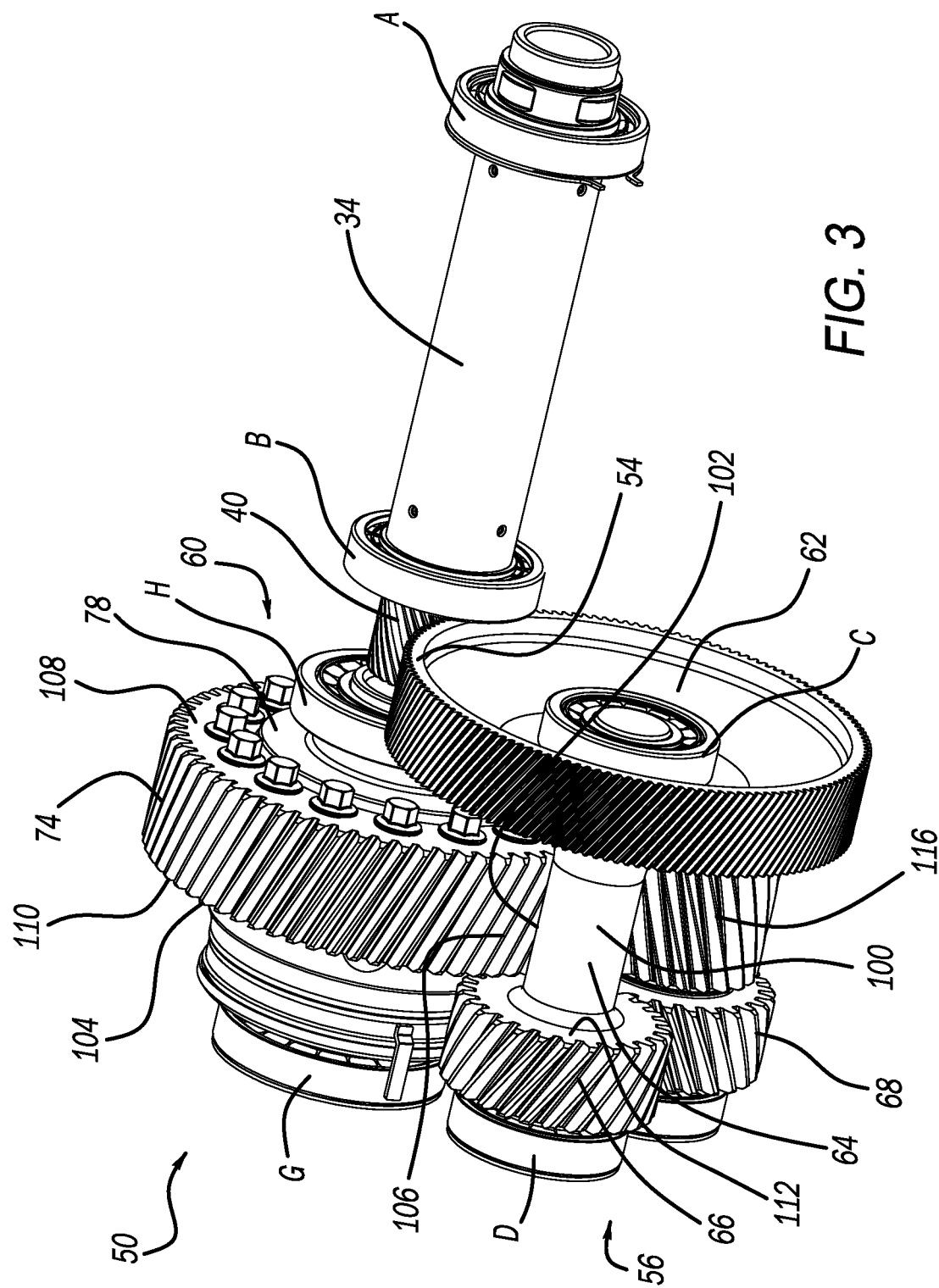
FIG. 3 is an isometric view of the power transmitting gear arrangement as viewed from the side of the first reduction gearset in a coaxial arrangement.

Referring to FIG. 3, where an isometric view of the power transmitting gear arrangement is viewed from the side of the first reduction gearset wherein a coaxial arrangement is shown. The first layshaft 64 with first gear 62 and second gear 66 can be seen spanning and positioned on either side differential gear 74. No power transfer occurs from first layshaft 64 to differential gear 74 as there is clearance provided between the two components. The axis of the first layshaft 64 is preferred to be positioned at the smallest radial distance from the axis of the rotor shaft 34 to reduce the space required, although depending on the ratio requirements of the first reduction gearset 54 this may be adjusted to increase center distance if needed. Typically, a balance of ratios of the first gearset 54 and third gearset 58 by varying the diameter of the differential gear 74 are used to optimize the packaging space. First layshaft 64 shaft portion 100 will be sized appropriately to transmit the power required and positioned relative to differential gear 74 closely but also to ensure a clearance is provided between first layshaft outer diameter 102 and differential gear outer diameter 104. As previously described, first layshaft 64 is designed to include a central shaft portion 100 providing connection between first gear 62 and second gear 66 but maintains an axial separating distance between first gear 62 and second gear 66, spanning across the width of differential gear 74 and transferring power from the first gearset 54 and second gearset 56. An axial distance or clearance is provided between the first gear inner face 106 and the differential gear first face 108 as well as between the differential gear second face 110 and the second gear inner face 112. Typically, due to the requirement of supporting the differential assembly 60 via bearing H and support plate 76 requiring a given axial space, space optimization between the first gear 62 and the differential gear 74 is not as controllable or critical as between the differential gear 74 and second gear 66. Axial space can be optimized by positioning second gear 66 of the second gearset 56 as close as possible axially to the differential gear 74. In other words, the shaft portion 100 of layshaft 64 will be provided at a length which allows a minimal clearance between the second gear inner face 112 and the differential gear second side 110. In previous electric drive axle and power transmitting gear arrangements the space outboard of the differential gear 74, i.e. on the opposite side away from the input shaft 34, has not been utilized resulting in a power transmitting gear arrangement which requires increased axial space when compared to the one proposed here.

Figure 4:
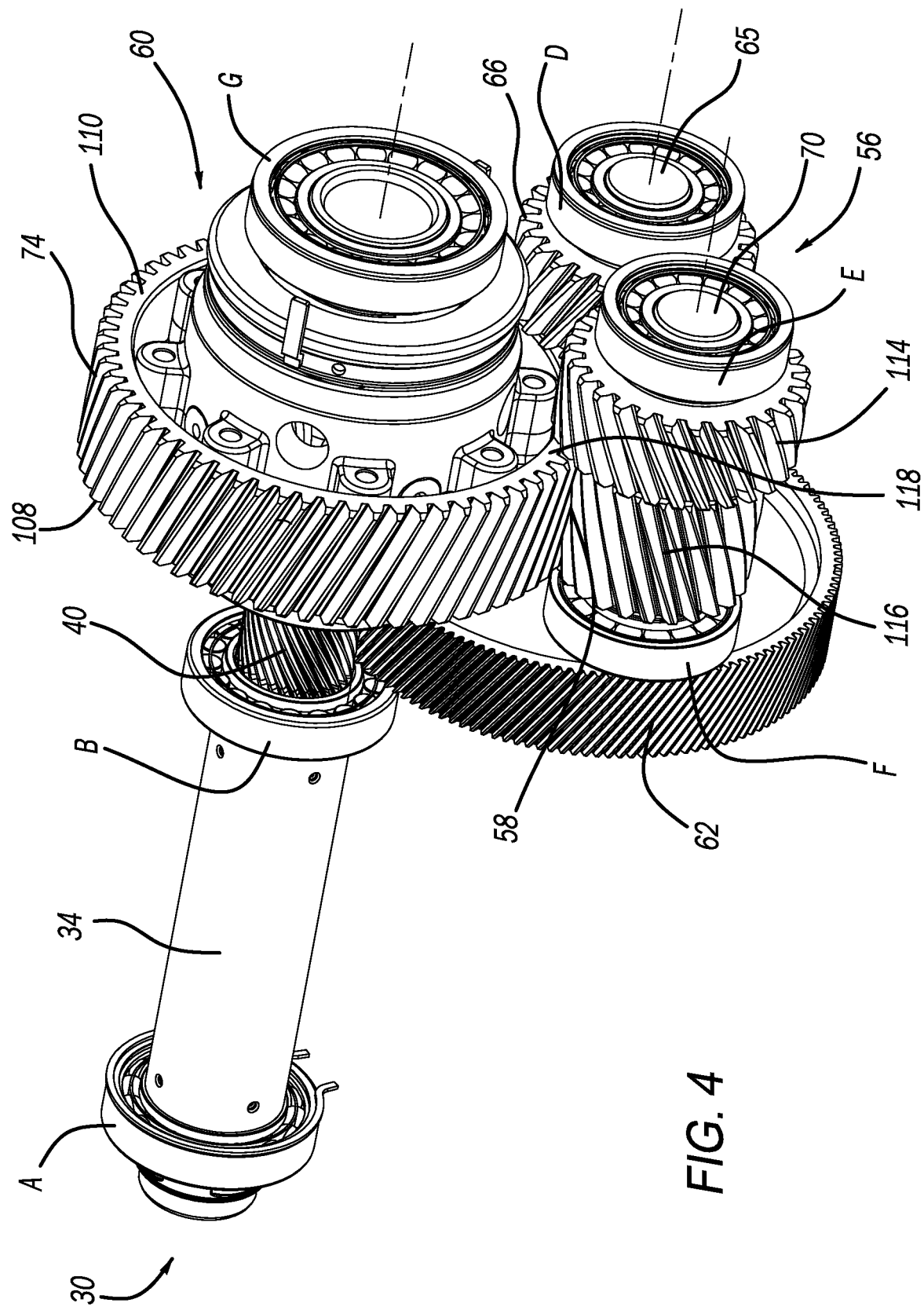
FIG. 4 is an isomeric view of power transmitting gear arrangement as viewed from the side of the second reduction gearset coaxial arrangement.

Referring to FIG. 4, an improved view of the second gearset 56, third gearset 58, and second layshaft 70 can be seen. Second layshaft 70, positioned on a third axis spaced at a radial distance from but parallel to the first and second axis, is supported at a first end journal E by bearing E for rotation relative to gearbox housing 52 and supported at a second end journal F by bearing F for rotation relative to support plate 76 which is fixed to system housing 32. Third gear 114 and fourth gear 116 are fixed to second layshaft 70. In this particular arrangement fourth gear 114 is integral to second layshaft 70 and third gear 114 is fixed via a pressfit to second layshaft 70. Other arrangements can be provided, but third gear 114 and fourth gear 116 must be fixed for rotation together. Power is provided to second layshaft 70 by second gearset 56 which comprises second gear 66 which is in constant meshed engagement with third gear 114. Power is transferred to fourth gear 116 via the fixed arrangement between third gear 114 and fourth gear 116 on second layshaft 70. Power is then finally transferred to differential gear 74 which is in constant meshed engagement with forth gear 116. As previously described, power will be transferred from differential gear 74 through differential assembly 60 to first 86 and second 92 output shaft. The face width of third gear 114 will be approximately the same as second gear 66 and the center of third gear 114 will be positioned axially aligned with the center of second gear 66. This will provide clearance between the differential gear second face 110 and third gear first face 118, similar to as described previously for second gear 64 while optimizing packaging.

Figure 5:
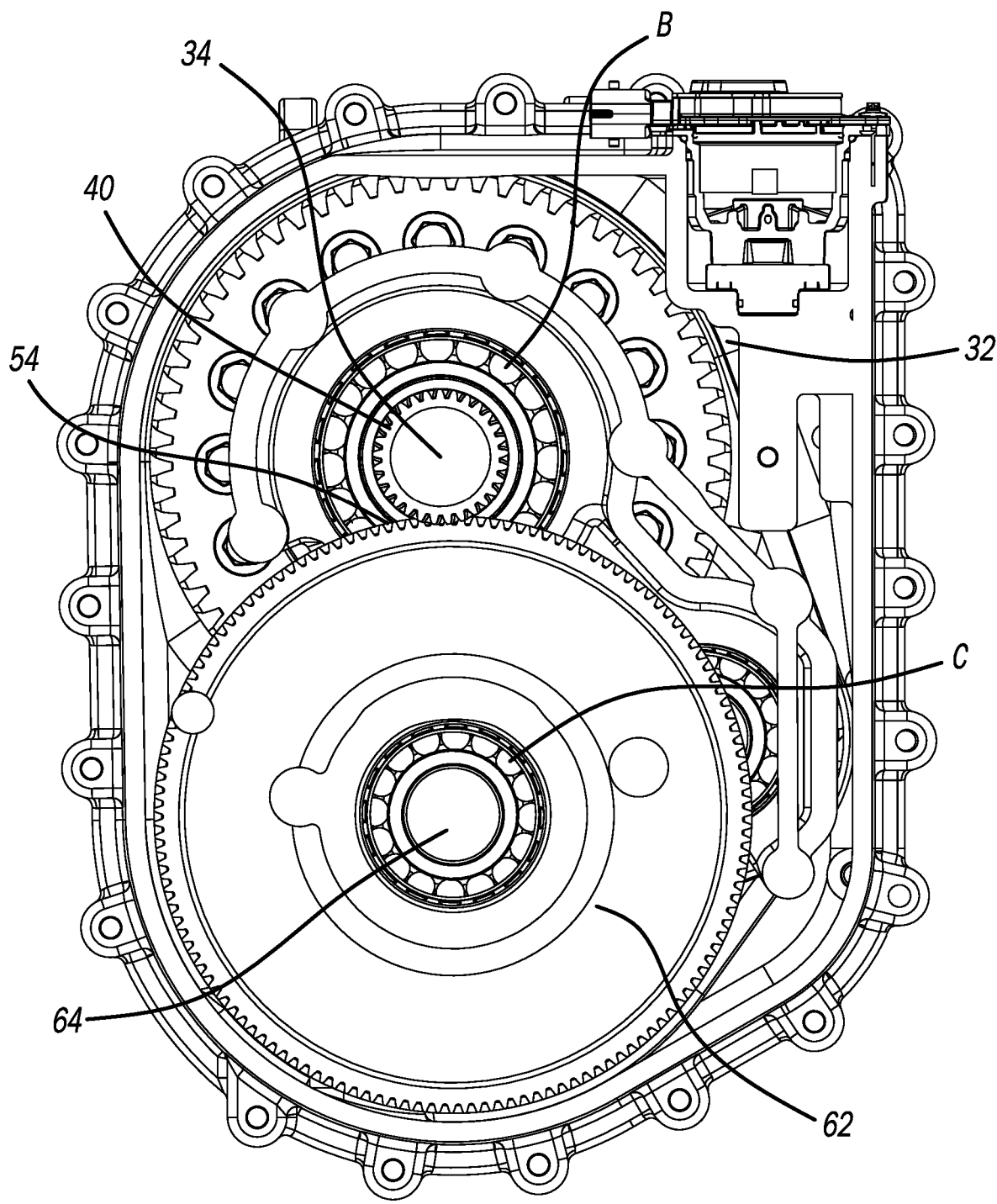
FIG. 5 is a sectional view of the first gearset.

FIG. 5 is a sectional view of the first reduction gearset with the section taken as shown in FIG. 2 showing the arrangement of first gearset 54 including input gear 40 which is in constant meshed engagement with first gear 62. Rotor shaft 34 is shown supported at its second end by bearing B for rotation relative to system housing 32. First layshaft 64, fixed for rotation to first gear 64, is supported at its first end by bearing C for rotation relative to system housing 32.

Figure 6:
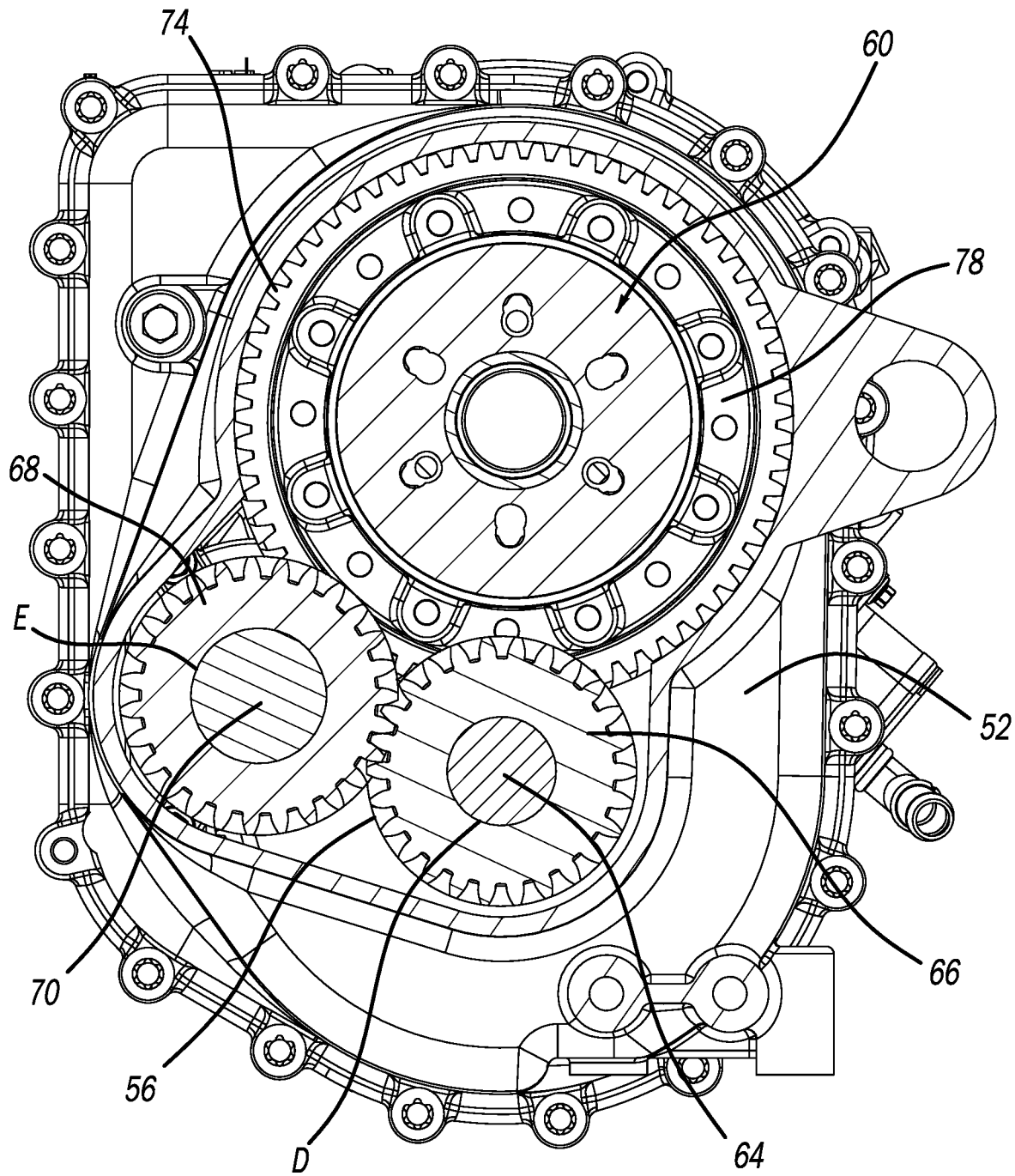
FIG. 6 is a sectional view of the second gearset.

FIG. 6 is a sectional view of the second gearset with the section taken as shown in FIG. 2 showing the arrangement of second gearset 56 including second gear 66 which is in constant meshed engagement with third gear 68. First layshaft 64 journal D is shown which is supported at its second end by bearing D (not shown in view) for rotation relative to gearbox housing 52. Second layshaft 70 journal E is supported at its second end by bearing E (not shown) for rotation relative to gearbox housing 52. The compact radial nature of the power transmitting gear arrangement 50 can be seen, as second gear 66 and third gear 68 are closely positioned around differential gear 74 and generally within the outer diameter extents of first gear 62.

Figure 7:
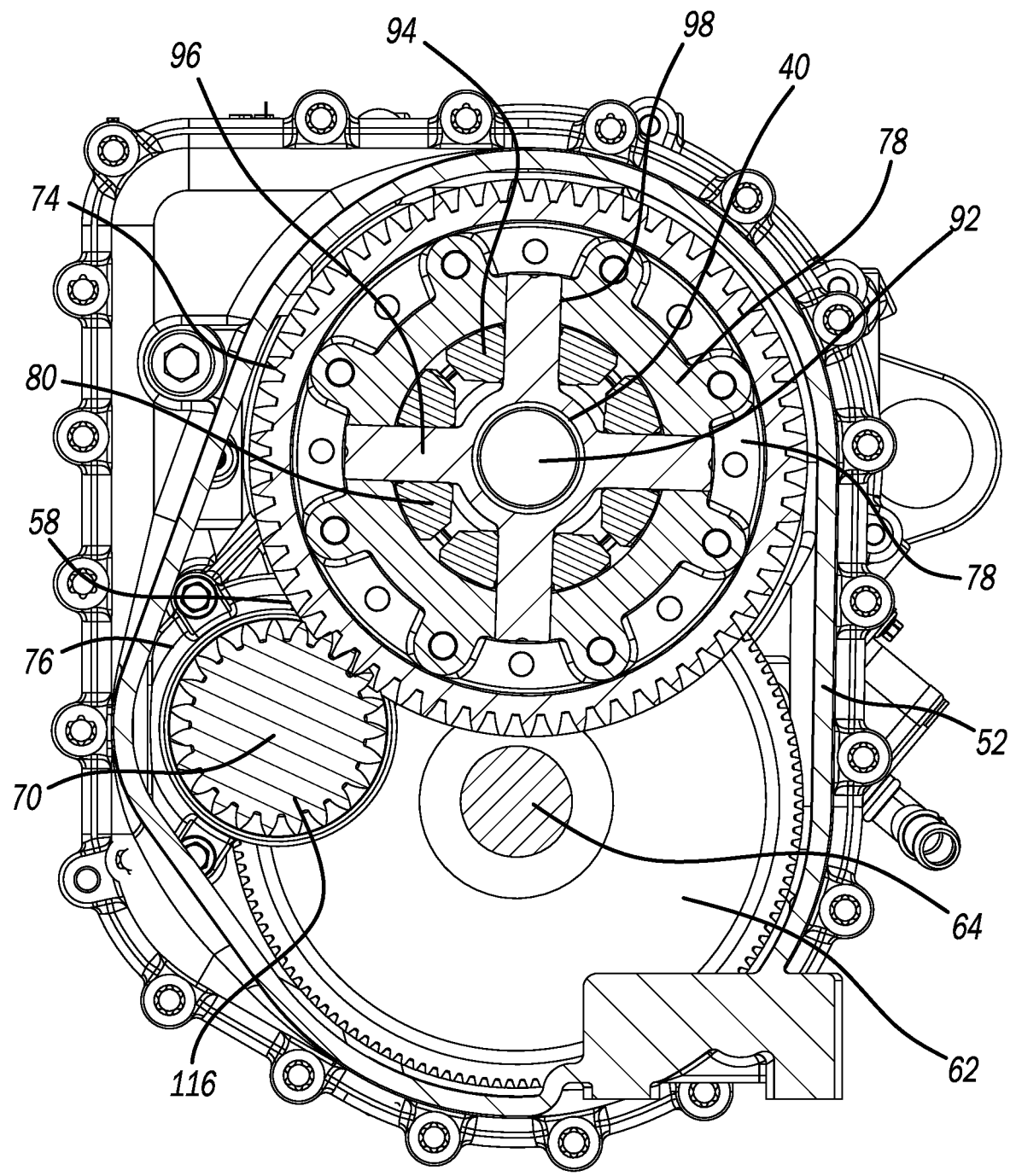
FIG. 7 is a sectional view of the third gearset.

FIG. 7 is a sectional view of the third gearset with the section taken as shown in FIG. 2 showing the arrangement of third gearset 58 including fourth gear 116 which is in constant meshed engagement with differential gear 74. Support plate 76 can be seen which supports second layshaft 70 on a first end by bearing F (not shown in view) for rotation relative to support plate 76. Support plate 76 provides support for the second layshaft 70 via bearing F and also differential assembly 60 via bearing H. Also, this section provides an improved view of the internal components of bevel gear differential 80, including pinions 94 and the interaction of pinion shaft 96 with bore 98 located in differential gear housing 78. This example includes four pinions 98, but other arrangements with differing number of pinions based on power requirements could also be considered.

The compact radial nature of the power transmitting gear arrangement 50 can be seen in the previous figures, as second gear 66 and third gear 68 are closely positioned around differential gear 74 and generally within the outer diameter extents of first gear 62, while fourth gear 116 is positioned within the extents of third gear 68.

Referring to FIG. 8 an isometric view of the power transmitting gear arrangement as viewed from the side of the first reduction gearset but arranged in an offset arrangement. An offset arrangement is defined as where the centerline of motor 28, and therefore rotor shaft 34 and input gear 40, is not concentric with the output and in the case of this geartrain, the centerline of the differential assembly 60. This is defined as distance X in the figure, where an offset is provided between the first input axis and the forth output axis. In this offset power transmitting gear arrangement 150, rotor shaft 34 has been rotated about the first gear 62 to provide the most offset distance X possible. Such an arrangement can be beneficial where reduced packaging space is available around the differential assembly 60, requiring motor 28 to be positioned at a distance away from differential assembly 60, and in a non-concentric arrangement with differential assembly 60 as shown in previous figures. Such an offset arrangement also can help to increase the overall reduction ratio as first gear 62 and differential gear 74 diameters could be increased resulting in the need for more radial space (i.e. from the centerline of the differential assembly 60), but still providing a compact axial arrangement where the second gearset 56 and first gear 62 continues to tightly surround differential gear 74 on opposite axial sides. Other offset arrangements, where rotor shaft 34 rotates about the second axis of first gear 62, therefore reducing the offset distance X can also be utilized depending on availability of packaging space.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed is:

1. A power transmission gearbox arrangement comprising:
   a power source driving a first gearset, a second gearset, a third gearset, and a differential assembly with a differential gear, wherein the first gearset is positioned on a first side of the differential gear and second gearset is positioned on a second side of the differential gear,
   a first layshaft connecting the first gearset and the second gearset,
   a second layshaft connecting the second gearset and the third gearset,
   wherein the third gearset drives the differential assembly, which distributes power between a first output shaft and a second output shaft,
   wherein the first gearset and the second gearset are on opposite axial sides of the differential assembly,
   wherein a rotor shaft directly connected to the power source and the first and second output shafts are coaxial, and the differential assembly and the rotor shaft of the power source are positioned on a common axis.

2. The gearbox arrangement of claim 1, wherein the first layshaft spans a width of a gearface of the differential gear.

3. The gearbox arrangement of claim 2, wherein the differential assembly includes a differential housing, wherein at least a portion of the differential housing and the differential gear are positioned in a space defined between the first gearset and the second gearset.

4. The gearbox arrangement of claim 1, wherein the first gearset includes a first gear meshed with an input gear fixed to the rotor shaft, and the second gearset includes a second gear axially spaced from the first gear on opposite sides of the differential assembly.

5. The gearbox arrangement of claim 4, wherein a centerline of a bevel gear arrangement including a pinion shaft and pinion gears of the differential assembly is disposed axially between the first gear and the second gear, such that the second gear is not disposed between the differential assembly and the first gear.

6. The gearbox arrangement of claim 1, wherein the first layshaft is radially offset from the rotor shaft and includes a first gear of the first gearset and a second gear of the second gearset connected by a central shaft portion, wherein the first gear is in meshed engagement with an input gear fixed to the rotor shaft, wherein the second gear is meshed engagement with a third gear of the second gearset.

7. The gearbox arrangement of claim 6, wherein the second layshaft includes the third gear of the second gearset and a fourth gear of the third gearset, wherein the fourth gear is in meshed engagement with the differential gear.

8. The gearbox arrangement of claim 7, wherein the second gear and third gear are axially aligned and have common face widths.

9. The gearbox arrangement of claim 8, wherein the second gear is within the outer diameter extent of the first gear, and the fourth gear is within the outer diameter extent of the third gear.

10. The gearbox arrangement of claim 1, wherein the first layshaft does not contact the differential assembly.

11. The gearbox of arrangement of claim 1, wherein the second layshaft is radially offset from the first layshaft and the first and second output shafts.

12. An electric drive axle comprising:
    an electric motor;
    a rotor shaft of the electric motor, the rotor shaft having an input gear fixed thereto and driving a first gearset, a second gearset, a third gearset, and a differential assembly with a differential gear, wherein the first gearset is positioned on a first axial side of the differential gear towards the electric motor, and the second gearset is positioned on a second axial side, opposite the first side, of the differential gear away from the electric motor, a first layshaft connecting the first gearset and the second gearset, wherein the first layshaft spans across the width of the differential gear;

a second layshaft connecting the second gearset and the third gearset;

wherein the third gearset drives the differential assembly, which distributes power between a pair of ground engaging wheels, wherein first and second output shafts are driven by the differential assembly, wherein the rotor shaft and input gear are coaxial with the first and second output shafts.

13. The electric drive axle of claim 12, wherein the first gearset includes the input gear and a first gear, the second gearset includes a second gear and a third gear, and the third gearset includes a fourth gear and the differential gear.

14. A power transmission gearbox arrangement comprising:

a power source driving a first gearset, a second gearset, a third gearset, and a differential assembly with a differential gear, wherein the first gearset is positioned on a first side of the differential gear and second gearset is positioned on a second side of the differential gear, a first layshaft connecting the first gearset and the second gearset, a second layshaft connecting the second gearset and the third gearset, wherein the third gearset drives the differential assembly, which distributes power between a first output shaft and a second output shaft, wherein the first layshaft does not contact the differential assembly wherein the first gearset includes an input gear and a first gear, the second gearset includes a second gear and a third gear, and the third gearset includes a fourth gear and the differential gear, wherein the first layshaft includes the first gear and the second gear fixed relative to a central shaft portion, and the second layshaft includes the third gear and the fourth gear fixed relative to each other.

15. The gearbox arrangement of claim 14, further comprising a rotor shaft directly connected to the power source, wherein the rotor shaft is radially offset from the first and second output shafts.

16. The gearbox arrangement of claim 14, further comprising a rotor shaft directly connected to the power source, wherein the rotor shaft and the input gear are radially offset from the first and second output shafts.

17. The gearbox arrangement of claim 14, wherein the first layshaft and the second layshaft are radially offset from each other and the first and second output shafts.

18. The gearbox arrangement of claim 17, wherein the differential gear is disposed axially between the first gear and the second gear.

* * * * *